April 12, 1938.  R. M. HAVOURD ET AL  2,114,185

TRANSFORMER LOAD INDICATOR

Filed May 7, 1936

Inventors:
Russell M. Havourd,
George A. Ewald,
by *Harry E. Dunham*
Their Attorney.

Patented Apr. 12, 1938

2,114,185

UNITED STATES PATENT OFFICE 2,114,185

TRANSFORMER LOAD INDICATOR

Russell M. Havourd, East Orange, and George A. Ewald, Plainfield, N. J., assignors to General Electric Company, a corporation of New York Application May 7, 1936, Serial No. 78,426

9 Claims. (Cl. 73—350)

Our invention relates to transformer load indicators. As the load on a transformer increases, the internal losses increase. These losses appear as heat and if the load becomes too great it may cause such internal temperatures as may cause damage to the transformer. The maximum load which a transformer can carry safely is not always the same but varies with the rate at which the internal heat can be dissipated. Thus a greater load can be safely carried when the air surrounding the transformer is cold than when it is warm because the heat from the transformer will be dissipated more rapidly to the cold air. It is often desirable that some means be provided which will indicate whether the load on a transformer can be increased without danger of overheating and injuring it. Instruments for this purpose have been suggested and used but there has been some criticism that they have not been sufficiently accurate for all conditions of load on the transformer.

The general object of the present invention is to provide an improved instrument of this type for indicating with substantial accuracy under all load conditions the ratio of the load being carried by a transformer at any time to the maximum safe load which the transformer could carry at the time by taking into consideration simultaneously the effect of the temperature of the transformer cooling medium and the temperature of the surrounding air.

Figure 1:
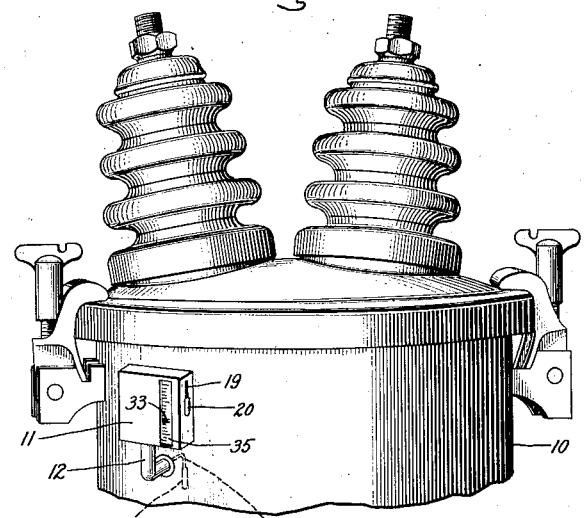
Figure 2:
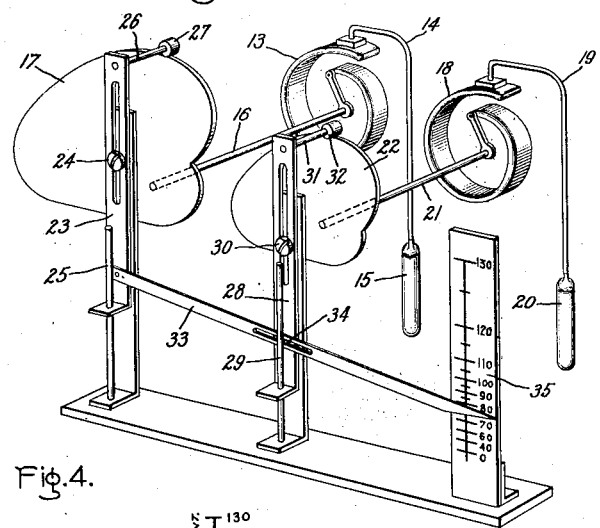
Figure 3:
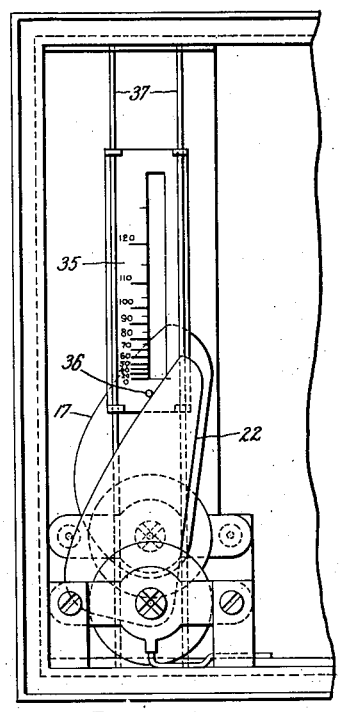
Figure 4:
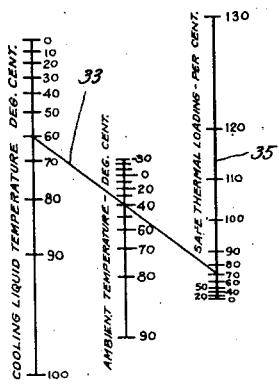

The invention will be better understood from the following description taken in connection with the accompanying drawing in which Fig. 1 shows the upper portion of a transformer of the liquid immersed type provided with a load-indicating instrument constructed in accordance with the invention; Fig. 2 is a diagrammatic, perspective view of the essential parts of the instrument; Fig. 3 is a view indicating a modified form of the invention; and Fig. 4 is an explanatory temperature-load chart.

Like reference characters indicate similar parts in the different figures of the drawing.

The transformer 10, shown in Fig. 1, is of the liquid-immersed type and is provided with an instrument 11 mounted on the side of the transformer casing by a tubular support 12 which provides communication between the casing of the instrument and the casing of the transformer for a purpose to be described later. The instrument, as shown in Fig. 2, includes a Bourdon tube 13 connected by a capillary tube 14 to a bulb 15. The Bourdon tube 13 is connected by a shaft 16 to a cam 17. The capillary tube 14 extends through the tubular instrument support 12 to the bulb 15 which is located inside the transformer casing and immersed in the cooling liquid so that the parts described are responsive to temperature changes of the cooling liquid in which the transformer itself is immersed. A second Bourdon tube 18 is connected through a capillary tube 19 to a bulb 20 and by a shaft 21 to a cam 22. The capillary tube 19 extends through the side of the casing of the instrument 11 so that the bulb 20 is located in the air surrounding the transformer casing. Thus the Bourdon tube 18 with its cam 22 is responsive to temperature changes of the air surrounding the transformer casing, that is, to the ambient temperature. A bar 23 sliding freely on guides 24 and 25 is supported by a pin 26 having a roller 27 resting on the cam 17. A second bar 28 sliding freely on guides 29 and 30 is supported by a pin 31 having a roller 32 resting on the cam 22. A pointer 33 is pivoted at one end to the bar 23 and is pivoted at an intermediate point by a pin and slot connection 34 to the bar 28. The other end of the pointer 33 travels over a scale 35.

It is desired that the pointer 33 indicate at any time the ratio between the load which is being carried by the transformer at the time and the maximum load which the transformer could safely carry under the same temperature conditions of the air surrounding the transformer and the cooling liquid in which the transformer is immersed. These relations can be calculated for a transformer with considerable accuracy and may be expressed by a formula. One formula which has been found to be approximately accurate is, $$R = \sqrt{k \frac{T - A - k_1}{k_2 - A}}$$

where R = the ratio between the load on the transformer at any time and the maximum safe load which the transformer can carry under the same conditions of temperature of the surrounding air and the cooling liquid in which the transformer is immersed;

T = the temperature of the hottest part of the cooling liquid in which the transformer is immersed;

A = the temperature of the air surrounding the transformer casing, that is, the ambient temperature; and $k$, $k_1$ and $k_2$ are constants depending upon the design characteristics of the transformer.

This equation can be reduced to the following form:

$$\frac{R^2}{k} - 1 = \frac{T-(k_1+k_3)}{k_2-A}$$

which can also be written $$\text{Log}\left(\frac{R^2}{k}-1\right) = \log(T-[k_1+k_3]) - \log(k_2-A)$$

Using this last equation with suitable values for $k$, $k_1$ and $k_2$ an alignment chart such as shown in Fig. 4 can be constructed which adds the logarithmic functions of R, T and A and thus performs the operation indicated by the original equation.

The Bourdon tubes 13 and 18 impart angular displacement to the shafts 16 and 21 with variations in temperature. The cams 17 and 22 impart logarithmic functions of ambient and cooling liquid temperatures through the linkage previously described to the pointer 33 which travels over the scale 35 which is also logarithmic. Thus the transformer load indicator performs mechanically the same operation that is performed mathematically by the alignment chart.

In the modified form of the invention shown in Fig. 3 the logarithmic scale 35 is provided with a pin 36 resting on the cam 22. The scale 35 slides freely on guides 37 so that its position is responsive to changes in the temperature of the air surrounding the transformer. The cam 17 is arranged close to the scale 35 so that the edge of the cam 17 will intersect the scale and indicate the desired value of the ratio R. In both forms of the invention it is apparent that the cams respond respectively to changes in cooling liquid and ambient temperatures and that these logarithmic responses are combined to indicate the desired ratio R on the logarithmic scale 35.

The invention has been explained by describing and illustrating preferred forms thereof but it will be apparent that changes may be made without departing from the spirit of the invention and the scope of the appended claims.

What we claim as new and desire to secure by Letters Patent of the United States, is,—

1. The combination with a transformer immersed in a cooling liquid, of logarithmic means responsive to changes in the temperature of the cooling liquid, logarithmic means responsive to changes in the temperature of the air surrounding the transformer, a logarithmic scale, and means controlled by both logarithmic means for indicating load conditions of the transformer on said scale.

2. The combination with a transformer immersed in a cooling liquid, of a logarithmic cam responsive to changes in the temperature of the cooling liquid, a logarithmic cam responsive to changes in the temperature of the air surrounding the transformer, a logarithmic scale, and means controlled by both cams for indicating load conditions of the transformer on said scale.

3. The combination with a transformer immersed in a cooling liquid, of a logarithmic cam responsive to changes in the temperature of the cooling liquid, a logarithmic cam responsive to changes in the temperature of the air surrounding the transformer, a logarithmic scale, a pointer movable over said scale, and means controlled by both cams for determining the position of the pointer on the scale to indicate load conditions of the transformer.

4. The combination with a transformer immersed in a cooling liquid, of a logarithmic cam responsive to changes in the temperature of the cooling liquid, a logarithmic cam responsive to changes in the temperature of the air surrounding the transformer, and a movable logarithmic scale controlled by one of said cams, the other cam being arranged to intersect the scale to indicate load conditions of the transformer.

5. The combination with a transformer immersed in a cooling liquid, of a logarithmic cam responsive to changes in the temperature of the air surrounding the transformer, a logarithmic scale controlled by said cam, and logarithmic means responsive to temperature changes in the cooling liquid for indicating load conditions of the transformer on said scale.

6. The combination with a transformer immersed in a cooling liquid, of means responsive to changes in the temperature of the cooling liquid, means responsive to changes in the temperature of the air surrounding the transformer, a movable logarithmic scale controlled logarithmically by one of said means, and means including a logarithmic cam controlled by the other of said means for indicating load conditions of the transformer on said scale.

7. An indicating instrument including logarithmic means for response to changes in the temperature of the liquid of a liquid immersed transformer, logarithmic means for response to changes in the temperature of the air surrounding a transformer, and logarithmic means controlled by both of said temperature responsive means for indicating transformer load conditions.

8. An indicating instrument including a logarithmic cam for response to changes in the temperature of the liquid of a liquid-immersed transformer, a logarithmic cam for response to changes in the temperature of the air surrounding a transformer, and a logarithmic scale cooperating with said cams for indicating transformer load conditions.

9. The combination with a transformer immersed in a cooling liquid, of a logarithmic cam responsive to changes in the temperature of the cooling liquid, a logarithmic cam responsive to changes in the temperature of the air surrounding the transformer, and means including a logarithmic scale cooperating with said cams for indicating transformer load conditions.

RUSSELL M. HAVOURD.
GEORGE A. EWALD.